(12) United States Patent
Meenan et al.

(10) Patent No.: US 11,128,733 B2
(45) Date of Patent: Sep. 21, 2021

(54) SERVER-SIDE RESOURCE PRIORITIZATION

(71) Applicant: CLOUDFLARE, INC., San Francisco, CA (US)

(72) Inventors: Patrick Meenan, South Riding, VA (US); Dane Orion Knecht, Austin, TX (US)

(73) Assignee: CLOUDFLARE, INC., San Francisco, CA (US)

(*) Notice: Subject to any disclaimer, the term of this patent is extended or adjusted under 35 U.S.C. 154(b) by 0 days.

(21) Appl. No.: 16/367,207

(22) Filed: Mar. 27, 2019

(65) Prior Publication Data
US 2020/0314208 A1 Oct. 1, 2020

(51) Int. Cl.
*H04L 29/08* (2006.01)

(52) U.S. Cl.
CPC ............ *H04L 67/322* (2013.01); *H04L 67/10* (2013.01); *H04L 67/28* (2013.01); *H04L 67/02* (2013.01)

(58) Field of Classification Search
CPC .............................. H04L 67/322; H04L 67/32
See application file for complete search history.

(56) References Cited

U.S. PATENT DOCUMENTS

| | | | | |
|---|---|---|---|---|
| 2013/0103791 A1* | 4/2013 | Gottdenker | ............. | H04L 67/02 709/217 |
| 2016/0173576 A1* | 6/2016 | Hayden | ............... | H04L 67/2838 709/203 |
| 2021/0021691 A1* | 1/2021 | Galloni | ................. | H04L 67/025 |

OTHER PUBLICATIONS

Grigorik, I., "High Performance Browser Networking," Chapter 12, published by O'Reilly Media, Inc., 2013 (no pub. month provided), licensed under CC BY-NC-ND 4.0, downloaded from https://hpbn.co/http2/ on Mar. 25, 2019, 25 pages.
IEEE 802.11-2016, "Wireless LAN Medium Access Control (MAC) and Physical Layer (PHY) Specifications," approved Dec. 7, 2016, 3534 pages.
Marx, R. (programmingart), "Sad to see no progress in 1.5 years since we started looking into this." Nov. 1, 2018, 1:38PM. Tweet, 1 page.

(Continued)

*Primary Examiner* — Nicholas P Celani
(74) *Attorney, Agent, or Firm* — Nicholson, De Vos, Webster & Elliott, LLP

(57) ABSTRACT

A process for prioritizing content responses executed by a first server in a distributed cloud platform. The first server including processor, and a non-transitory machine-readable storage medium that provides instructions that, when executed by the processor, causes the first server to perform operations including to receive, at a proxy server, a request for a plurality of content items from a client device, where the proxy server is in a distributed cloud computing platform, to receive at least one of the plurality of content items from an origin server or a cache, to determine a priority scheme for ordering the plurality of content items, where the priority scheme differs from a priority scheme of the client device and differs from a priority scheme of a domain of the plurality of content items, and to send a response including the plurality of content items to the client device in an order according to the priority determined scheme.

12 Claims, 7 Drawing Sheets

(56) References Cited

OTHER PUBLICATIONS

Mcmanus, P., "HTTP/2 Dependency Priorities in Firefox 37," Bits Up! Blog, Jan. 7, 2019, downloaded from http://bitsup.blogspot.com/2018/05/the-benefits-of-https-for-dns.html on Mar. 25, 2019, 2 pages.

MEENAN, P. (patmeenan). "ugh. Browser's implementations of HTTP/2 priorities are worse that I could have imagined (Chrome and Firefox at least try). I'll write it up with pictures and debugging how-to but here are the basics: (thread)." Nov. 1, 2018, 11:45 AM. Tweet, 1 page.

Meenan, P., "Resource Fetch Prioritization and Scheduling in Chromium," Aug. 5, 2015, downloaded from https://docs.google.com/document/d/1bCDuq9H1ih9iNjgzyAL0gpwNFiEP4TZS-YLRp_RuMIc/edit on Mar. 25, 2019, 9 pages.

nginx.org, "A debugging log," published as early as Jan. 16, 2010, downloaded from http://nginx.org/en/docs/debugging_log.html on Mar. 25, 2019, 2 pages.

Osmani, A. (addyosmani), "Priority Hints," Explainer.md, GitHub, Jun. 11, 2018, downloaded from https://github.com/WICG/priority-hints/blob/master/EXPLAINER.md on Mar. 25, 2019, 2 pages.

webpagetest.org, http2_dependencies.php test results, downloaded from https://www.webpagetest.org/http2_dependencies.php?test=181101_ZV_1af60608bf1c234c5c5015376796e80d&run=1 on Mar. 25, 2019, 2 pages.

webpagetest.org, "Test a website's performance," downloaded from https://www.webpagetest.org/ on Mar. 25, 2019, 2 pages.

Wijnants, et al., "HTTP/2 Prioritization and its Impact on Web Performance," 2018 IW3C2, Creative Commons CC by 4.0 License, ACM ISBN 978-1-4503-5639-8/18/04, Apr. 23-27, 2018, 10 pages.

Wikipedia, "Forward secrecy," Mar. 20, 2019, downloaded from https://en.wikipedia.org/wiki/Forward_secrecy on Mar. 25, 2019, 5 pages.

* cited by examiner

SERVER-SIDE RESOURCE PRIORITIZATION

FIELD

Embodiments of the invention relate to the field of network computing; and more specifically, to a proxy server that prioritizes streaming a resource to at least one requesting client device while the resource is being received at the proxy server is described.

BACKGROUND

Web browsers and similar client applications that run at client devices access network resources by making hypertext transfer protocol (HTTP) requests that are directed to an origin server. With SPDY, HTTP/2 and QUIC web request protocols, the client applications make requests of network resources provided by the origin server and specifies how the responses should be delivered (in what order and how to split bandwidth between them). However, the specified prioritization of the responses varies by the client application. The specified prioritization of the client applications is not consistent and are not based on any information about the requested network resources that enables the prioritization to be an optimal user experience or use of bandwidth.

The prioritization of requested content items that make up a network resource must be supported at the origin server to be implemented. Generally, the origin servers that support the SPDY, HTTP/2 and QUIC prioritization attempt to honor the prioritization (e.g., in terms of dependencies and weights) that the client applications specify. Good prioritization is critical to the user experience, particularly on slower connections where the difference between good and bad prioritization can be tens of seconds to minutes of a blank screen before seeing the requested content load. However, many client applications like web browsers have poorly constructed prioritization schemes or lack any support for prioritization. Those client applications that do support prioritization provide a generic prioritization strategy that will not be optimal for all applications and conditions.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A method and apparatus for a proxy server to prioritize content items of a network resource returned in a set of responses to a set of requests from a client device for the network server. The proxy server receives a request for a network resource (e.g., a web page) from a first client device. The request may be, for an example, an HTTP/S request for a web page, web application or similar network resource. For instance, the requested network resource could be a web page with scripts, images, audio and similar related files. The proxy server determines whether the network resource is fully available in a local cache that is available to the proxy server. Where the network resource is not fully available in the local cache, the proxy server transmits a set of requests for the network resource to another server (e.g., the origin server) and begins receiving the content items associated with the network resource. While the network resource is being received, the proxy server sends responses to the requesting client device without waiting for all of the content items of the network resource to be fully received at the proxy server. The proxy server however can alter the order (i.e., re-prioritize) the content items being sent to the requesting client device. Thus, the proxy server can implement a prioritization scheme that improves the throughput and responsiveness between the proxy server and the client device for key content items to reduce their load times and improve user experience.

Figure 1:
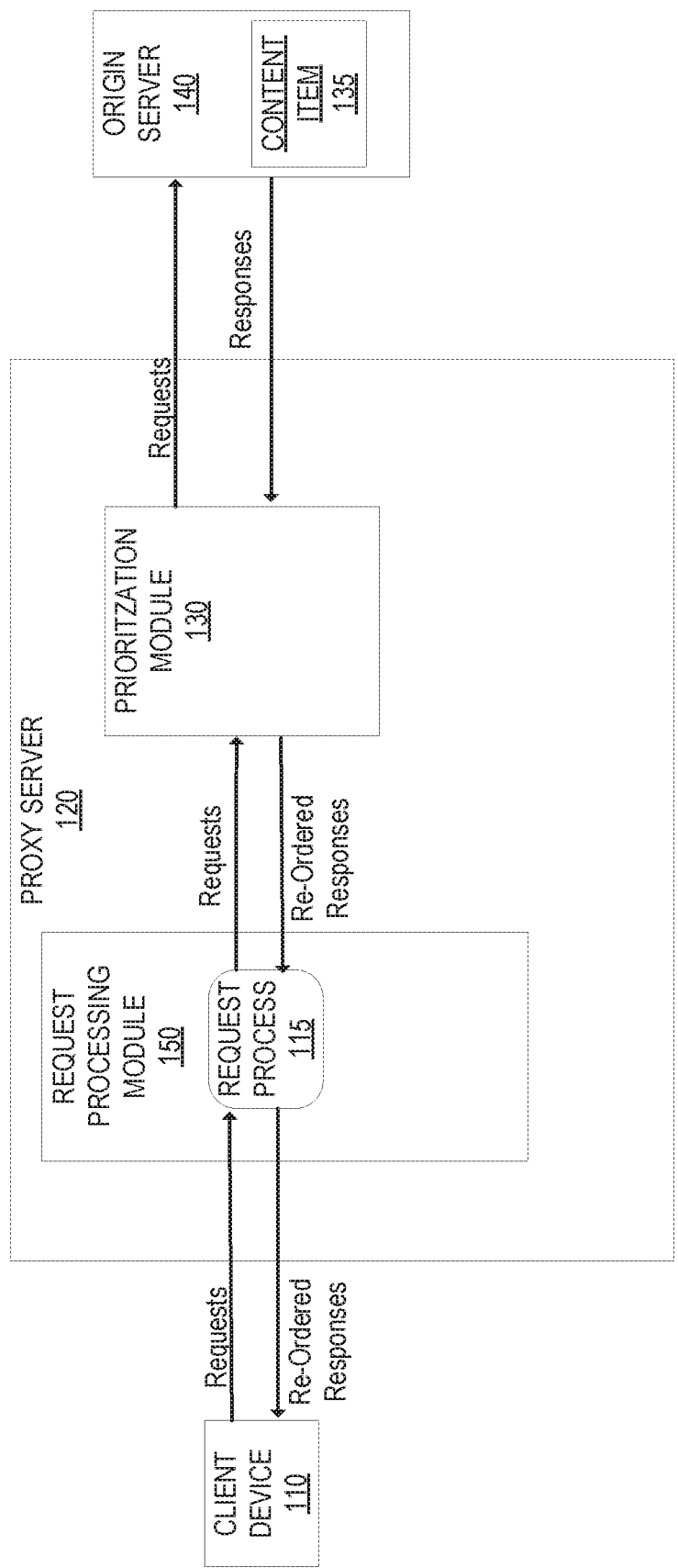
FIG. 1 is a sequence diagram that illustrates exemplary operations for a proxy server receiving a set of requests for a network resource and the constituent content items and the prioritization of responses with the requested content items according to an embodiment.

FIG. 1 is a sequence diagram that illustrates exemplary operations for a proxy server that provides a prioritization module to manage the order of content item responses for client devices while the resource is being received at the proxy server according to an embodiment. The diagram includes a client device 110 that is communicatively connected to the proxy server 120. Each client device 110 is a computing device (e.g., laptop, workstation, smartphone, mobile phone, tablet, gaming system, set top box, wearable device, Internet of Things (IoT) device, etc.) that is capable of transmitting and/or receiving network traffic. Each client device may execute a client network application such as a web browser, native application, or other application that can access network resources (e.g., web pages) that are associated with or include a set of content items (e.g., images, word processing documents, PDF files, movie files, music files, or other computer files). In the example embodiment of FIG. 1, a single client device and proxy server are illustrated for sake of clarity and conciseness. However, one skilled in the art would understand that a proxy server can service any number of client devices and that any number of proxy servers may be present in a network such as a distributed to service network resource requests.

The proxy server 120 is a physical server that is configured to retrieve a network resource to requesting client devices as will be described in greater detail herein. The proxy server 120 has a multi-processor architecture where each request may be handled by a different process and/or potentially on a different processor. The proxy server 120 includes a request processing module 150 that includes a set of request process 115. A 'set,' as used herein refers to any whole number of items including one item. The request processing module 150 may be acting as a reverse proxy web server with caching. Each request process 115 processes one or more requests. The request process 115 may be executed on any processor or core available to the proxy server. Although a single request processes is illustrated, there may be more request processes being executed on the proxy server 120. Each request process 115 can process multiple requests concurrently. The proxy server 120 can also include a memory structure that can be a shared memory that is available to each of the request processes 115. The memory structure includes non-transitory computer readable media for storing data and instructions. In some embodiments, the memory structure can include a cache for content items and related data about the cached content items. The cache can be utilized to store previously retrieved content items such that the request processing module does not have to request these content items from an origin server 140 on subsequent requests from client devices. The cache is communicatively available to the proxy server. The cache can be included within the proxy server 120 or may be physically separate from the proxy server. If physically separate, the cache is available to the proxy server 120 and is typically part of the same colocation site. That is, it is generally faster to retrieve files from the cache instead of from the origin server 140.

Although not illustrated in FIG. 1, the proxy server 120 may be part of a distributed cloud computing network that includes multiple proxy servers that are geographically distributed. The proxy servers may be in different points-of-presences (PoPs). Each PoP may include one or more physical servers (e.g., one or more proxy servers, one or more control servers, one or more domain name service (DNS) servers (e.g., one or more authoritative name servers, one or more proxy DNS servers), and one or more other pieces of network equipment such as router(s), switch(es), and/or hub(s)). Each PoP may be part of a different data center and/or colocation site. The distributed cloud computing network may provide different services for customers (e.g., domain owners or operators) such as protecting against internet-based threats, performance services (e.g., acting as a content delivery network (CDN) and dynamically caching customer's files closer to visitors, page acceleration/optimization), TCP stack optimizations, and/or other services. Although not illustrated in FIG. 1, there are other physical devices between the proxy server 120 and the client devices such as routers, switches, and similar network and computing devices.

The origin server 140, which may be owned or operated directly or indirectly by a third-party to the distributed cloud computing network, is a computing device on which a network resource resides and/or originates (e.g., web pages) that have an associated set of content items 135) (e.g., images, word processing documents, PDF files movie files, music files, or other computer files). The origin server 140 can service requests for these content items. The content items may be associated with a domain, where the domain is a network of commonly administered computers or devices typically having an associated domain name. The origin server 140 can service multiple domains. The origin server 140 can be any type of computing device (e.g., server, cloud computing platform or similar computing devices) and have any type of data storage system to store the content items.

The proxy server 120 may operate as a reverse proxy and receive requests for network resources (e.g., HTTP requests) of a domain of the origin server 140. In an embodiment where the proxy server 120 is one of multiple proxy servers that are part of a distributed cloud computing network, the proxy server 120 may receive a request from a particular client device as determined by the network infrastructure according to an Anycast implementation or by a geographical load balancer. For instance, each of the proxy servers may have a same anycast IP address for a domain of the origin server 140. If the origin server 140 handles the domain "example.com," a DNS request for "example.com" returns an address record having the anycast IP address of the proxy servers. Which one of the proxy servers receives and handles a request from a client device depends on which proxy server is closest to the client device in terms of routing protocol configuration (e.g., Border Gateway Protocol (BGP) configuration) according to an anycast implementation as determined by the network infrastructure (e.g., router(s), switch(es), and/or other network equipment between the requesting client and the proxy servers). In some embodiments, instead of using an anycast mechanism, a geographical load balancer is used to route traffic to the nearest proxy server.

In an embodiment, the proxy server 120 receives a request for a network resource of a domain of the origin server 140 because the DNS record(s) for that domain are changed such that DNS records of hostnames of the domain point to an IP address of the proxy server instead of the origin server 140. In some embodiments, the authoritative name server of the third-party domain is changed to an authoritative name server of the distributed cloud computing network and/or individual DNS records are changed to point to the proxy server 120 (or point to other domain(s) that point to the proxy server 120). For example, the domain owners may change their DNS records to point to a CNAME record that points to the proxy server 120.

Figure 2:
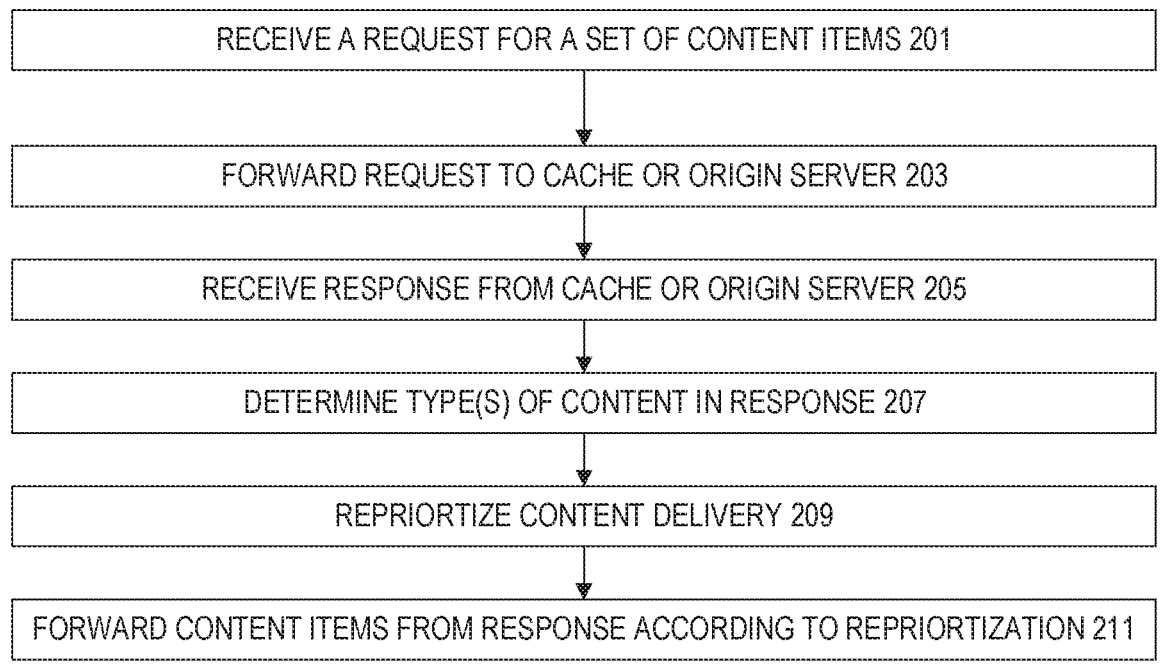
FIG. 2 is a flow diagram that illustrates exemplary operations for a proxy server handling a request from a client devices and prioritizing content items for a response to the request to the client device according to an embodiment.

FIG. 2 is a flowchart illustrating a process for providing prioritized responses to network resource requests in one embodiment. At operation 201, the proxy server receives a request for a network resource associated with a set of content items. For example, referencing FIG. 1, the proxy server 120 receives a request for a content item 135 of a domain of the origin server 140 from the client device 110. For instance, the request may be an HTTP/S GET request. In the example of FIG. 1, the request is for a network resource that includes the content item 135. The requested content item can be any type of content item (e.g., images, audio, applications or similar content items). The request is processed by a first request process 115 of the proxy server 120. For example, the request from the client device 110 is processed by the request process 115. In an embodiment, the proxy server 120 receives the request because a DNS request for the hostname returns an IP address of the proxy server 120 instead of the origin server 140.

Next, at operation 203, the request process or similar process of the proxy server 120 determines whether the content item 135 is available in the cache. If the content item is not available in the cache, the proxy server 120 transmits a request for the file to the origin server 140. This request may be an HTTP/S GET request and be similar to the request received in operation 1. In the example of FIG. 1, this request is for the content item 135. Although FIG. 1 shows the proxy server 120 transmitting the request for the content item to the origin server 140, in another embodiment the proxy server 120 transmits the request for the file to a different server (e.g., a different proxy server that may have the file cached).

At operation 205, the proxy server 120 receives a response from the origin server 140 or is able to retrieve the content item from the cache. The amount of time necessary to receive the content item 135 from the origin server 140 depends, in part, on the size of the content item 135 and the available transmission bandwidth. At operation 207, as the content item is being received from the origin server 140 or from the cache, the proxy server 120 determines the type of the content item and any related content items that are part of a request for a network resource. For example, if the requested network resource was a web page, then the retrieved content items can include the HTML file of the web page, images of the web page, and similar content items.

At operation 209, the prioritization module at the proxy server determine an order or priority of the content items to be returned to the client device. The operation of the prioritization module to determine the order of the content items is discussed further herein below with reference to FIGS. 3-6. The prioritization module can re-order the content items retrieved from the cache and the origin server from a default order that can be set by the client device (e.g., a browser can request a specific prioritization), the origin server, or the default configuration of the requested network resource. The prioritization module can re-order the individual bytes of the content items in addition to the content items as a whole. For example, multiple images can be interleaved or higher priority content items or portions thereof can be inserted into a response stream during transmission of lower priority content items.

At operation 211, the request processing module and request process forward the content items to the client device as a set of re-ordered responses according to the prioritization scheme determined by the prioritization module. The prioritization module can thereby improve the speed and quality of the user experience in accessing the requested network resource as further discussed herein below.

Figure 3:
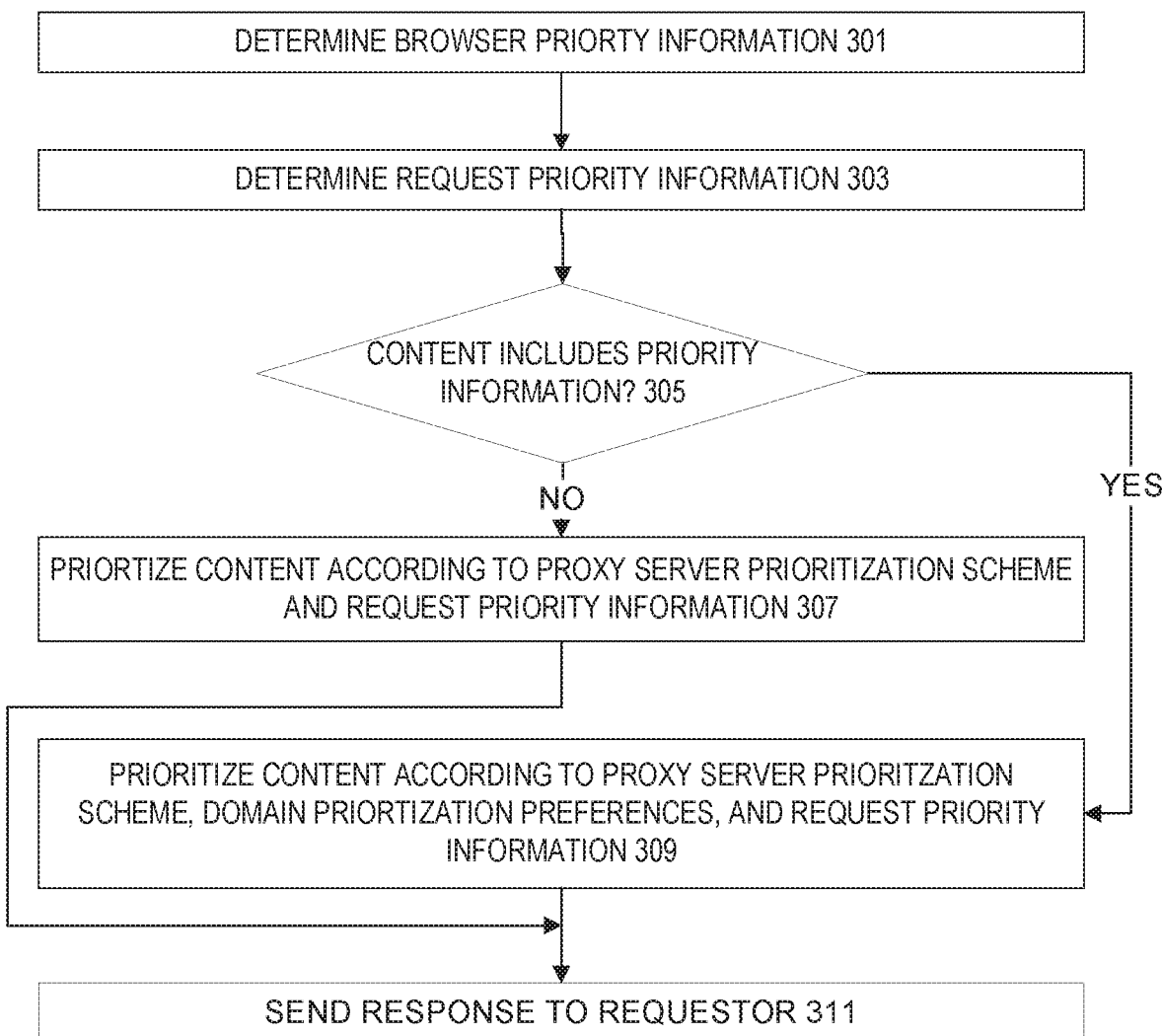
FIG. 3 is a flow diagram that illustrates exemplary operations for prioritizing content items for a response to the client device.

FIG. 3 is a flow diagram that illustrates exemplary operations of a prioritization module for a proxy server to re-order the content items to requesting client devices according to an embodiment. The operations of FIG. 3 will be described with respect to HTTP/S request and responses. But, the operations of FIG. 3 can be performed with different types of requests and responses such as QUIC requests and response. In an embodiment, the first server referred to in FIG. 3 is the proxy server 120 and the second server referred to in FIG. 3 is the origin server 140.

This process is a part of the operation 209 described above with reference to FIG. 2, where the prioritization module is handling a set of content items and a set of responses to a request from a client device. A first server receives a first request for a file from a first client device. The requested file may be relatively large (e.g., greater than 500 MB). The request may be an HTTP/S request. The request is for a file of a domain handled by a second server (e.g., an origin server). That is, the file does not originate from the first server.

At operation 301, the prioritization module determines the priority information of the browser or similar client device-based prioritization information. Browser implementations of HTTP/2, QUIC and similar prioritization vary significantly and even in the best cases are still not optimal. HTTP/2 and QUIC do not enforce browser prioritization in any way and thus the browser prioritization can be treated as a suggestion from the client device on content item delivery order. Delivering content items in an optimal order can have a significant impact on the user experience such as the performance of browser loading a page. Making the prioritization programmable on the server-side provides significant benefits. Browsers with poor prioritization schemes can have their prioritization over-ridden and content items can be delivered in an optimal order even with no client support. Browsers with good or reasonable prioritization schemes but with gaps or issues can be improved (e.g., allowing for images to download concurrently where the browser fails to enable this behavior). Cases where a specific application is not optimal with a "default" prioritization scheme can be improved on an application-by-application basis.

At operation 303, the prioritization module determines the prioritization information of a specific client device request. This can include the prioritization information specified in the request itself that may be based on request protocol or similar factors. As the content items are returned by the cache or origin server, the prioritization module can examine the content items to determine if they include information related to prioritization, at operation 305. The content items can include information about their type or similar information that is collected to assist in the re-ordering of the content items for delivery to the client device. In addition, a domain of the content items can include specific prioritization scheme information where the domain attempts to manage the prioritization of the responses for the content items.

At operation 307, if there was not any priority information from the domain of the content items handled by the origin server, then the prioritization module determines a prioritization scheme that is based on the configured prioritization scheme of the proxy server that can be modified in some cases to accommodate some priority preferences from the client device (e.g., from the browser). At operation 309, if there is priority information for the domain of the content item provided by the origin server, then the prioritization module determines a prioritization scheme that is based on the configured prioritization scheme of the proxy server that can be modified in some cases to accommodate some priority preferences from the client device (e.g., from the browser) as well as the prioritization scheme of the domain. At operation 311, the prioritization module re-orders the content items and orders them into a set of responses to be sent to the client device according to the prioritization scheme determined at operations 307 or 309.

The prioritization module can be configured to accommodate a wide range of priority schemes that can be configured by domain administrators or other entities. In some embodiments, rather than administrator configuration of the priority scheme, machine learning, or similar mechanisms can be utilized to determine optimal prioritization for individual pages. The prioritization module can also observe the content items they are returned from the origin server and sent to the client devices to track performance and inform the prioritization of future requests. Client devices can also provide feedback on the efficacy of the prioritization schemes to enable further optimization of the prioritization scheme.

The embodiments of the prioritization module improve performance and user experience in accessing network service (e.g., in HTTP/2 and QUIC) by using a prioritization strategy, driven by the proxy server, rather than the current approach of using a prioritization based on browser assumptions. Proxy (e.g., edge device) driven prioritization can follow a standard provider defined structure by default or can be fine-tuned by customers for their individual network resources (e.g., web pages and content items).

The operations of the proximity module in developing a priority scheme can support site-specific (i.e., domain specific) logic. Customers or administrators can determine priority ordering independent of browser support and without relying on additional technology such as priority hints to be implemented by network resource request technologies. In some embodiments, advanced features can be built on top of the custom priority support provided by the prioritization module including learning the optimal priority for individual pages and changing priority mid-stream for progressive images (allowing for server-side image streaming).

The prioritization module can support modifying the prioritization of a given request including enabling the re-ordering of requests, specifying concurrency of download for requests (e.g., exclusive, shared sequential or shared concurrent), and providing a mechanism to dynamically change the priority of an in-flight response at various byte offsets in the file (e.g., progressive image delivery).

Figure 4:
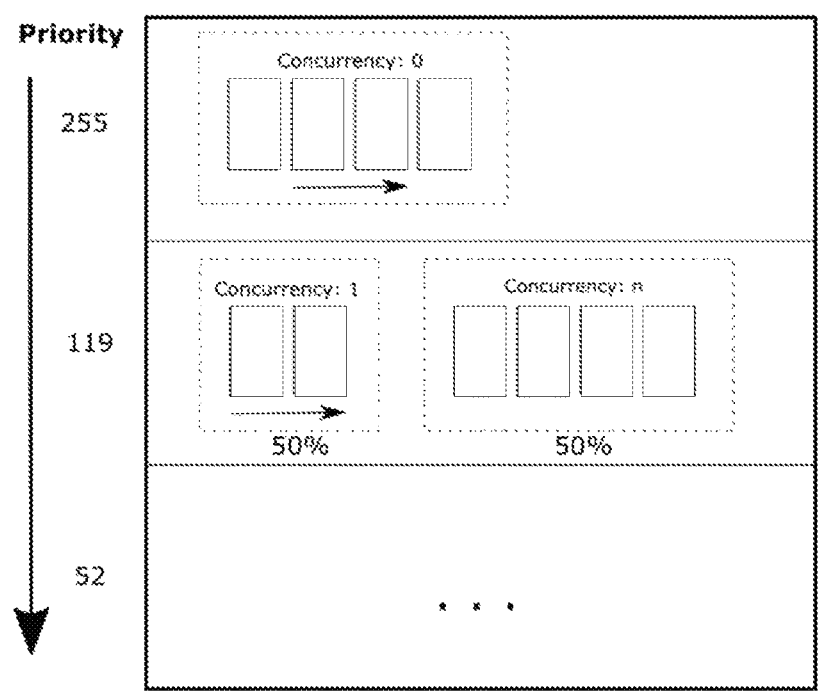
FIG. 4 is a block diagram illustrating an example prioritization scheme of the prioritization module.

FIG. 4 is a diagram illustrating a first example prioritization scheme. In the illustrated example, a priority scheme can be provided by the prioritization module where the sequencing of content items in responses can be handled by classifying each content item request with a priority level from 0-255 (e.g., with 255 being highest priority). Requests at a higher priority are delivered before requests at a lower priority (with no concurrency crossing priority boundaries). In the illustrated example, responses have priority 255 and 119. Requests at the same priority level are delivered in the order they are requested (e.g., the stream identifier can be increased in order of the requests, delivering them in order of stream identifier). Strictly using priority levels would not allow for controlling the concurrency of requests so the prioritization scheme can also include another parameter for the priority of each request (e.g., concurrency (0, 1 or n)). Requests with a concurrency of 0 are delivered first at a given priority level and without sharing bandwidth with any other requests. This is optimal for things like blocking scripts and CSS.

In this first example prioritization scheme, requests with a concurrency of 1 are grouped together and delivered sequentially within the group. The group as a whole splits bandwidth evenly with the requests with concurrency n. (i.e., 50% to the one resource at a time in the concurrency 1 group and 50% to the n-concurrency group). This is optimal for things like async or deferred scripts where it is desirable for user experience to load them quickly but not exclusively and where they are optimally delivered completely and in order. Requests with a concurrency n are grouped together in a single group (regardless of each request's concurrency).

In one embodiment, the bandwidth is split evenly across all requests in the group. Bandwidth splitting is done at a frame-by-frame level where the next frame to be sent is evaluated as every frame of data is being prepared to be sent (assuming the data streams are chunked in a configurable frame size for processing). In one embodiment, the prioritization scheme (1) only considers responses where data is available to be sent, (2) selects from the responses with the highest priority level, (3) where "concurrency 0" responses are available, the process fills the frame with the "concurrency 0" response that was requested earliest (i.e., the lowest stream identifier for HTTP/2), (4) otherwise, the process can utilize a round robin between the "concurrency, 1" and "concurrency n" groups, picking one frame from each group. Within the "Concurrency 1" group (5), the process fills the frame with the response that was requested earliest (i.e., the lowest stream identifier for HTTP/2). Within the "concurrency n" group (6), the process utilizes a round robin across all of the available responses.

The first example prioritization scheme assumes that the priority information will be available at the start of a response (i.e., in a response header) so dynamically adjusting the priority mid-response can be managed in a way that it can be done automatically. This can be achieved by providing a list of byte offsets and new priority levels. As each frame is sent the byte offset is checked and if it crossed a specified threshold the priority of the request will be changed to the new priority level. In other embodiments the concurrency could also be adjusted for completeness. The main use case for this embodiment is progressive image delivery where the initial scans of an image are delivered first and then the priority for the final scans are delivered after other images have completed.

Figure 5:
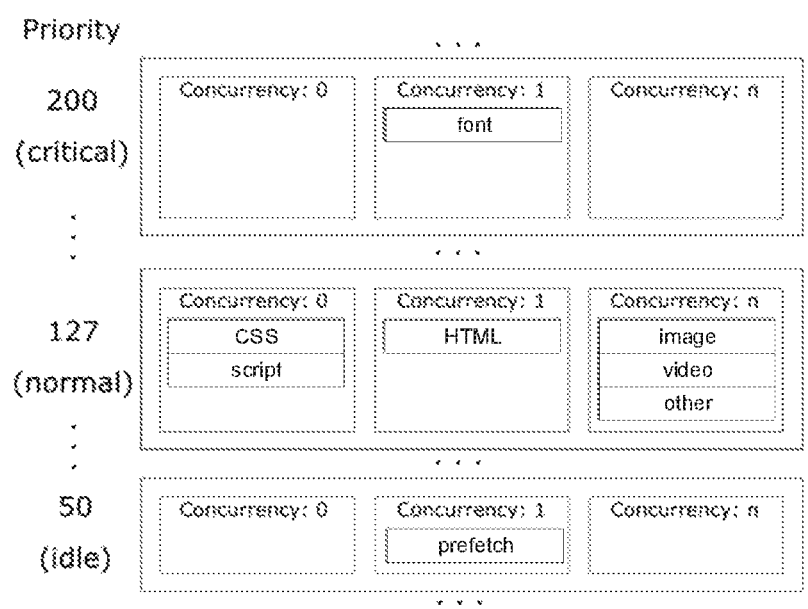
FIG. 5 is a block diagram illustrating another example prioritization scheme of the prioritization module.

FIG. 5 is a diagram of a second example prioritization scheme according to one embodiment. In this example prioritization scheme, a request header for inbound requests is added with the current HTTP/2 or QUIC information (weight, exclusive). For cases where the parent stream is a placeholder stream for grouping, the process also provides the parent stream identifier and weight (as a "group"). This is informational for downstream processing and can be used for identifying things like important scripts vs async scripts. For example, this information can be represented as, cf-request-priority: weight=192; exclusive=1, or cf-request-priority: weight=192; exclusive=0; group=3; group-weight=127.

The second example prioritization scheme can map the existing HTTP/2 priorities to the new priorities using a "default prioritization," The second example prioritization scheme can add support for a response header to specify the priority level and concurrency separated by a slash cf-priority: 255/0, cf-priority: 119/1, cf-priority: 119/n). The second example prioritization scheme can add support for a separate response header that specifies priority changes at specific byte offsets. The priority changes can be a comma-separated list in the format <bytes>:<priority>/<concurrency>, For example, cf-priority-change: 10240:52/n,20480:24:1.

The second example prioritization scheme includes a default prioritization. Mixing and matching the existing HTTP/2 prioritization with the second example prioritization scheme can lead to issues with mixing responses from both prioritization schemes. The performance and consistency can be optimized with clear default priorities such that customers and developers can prioritize their explicit responses accordingly.

The proxy server can maintain a basic mapping of mime type to priority/concurrency if explicit prioritization isn't provided through response headers. For example, FIG. 5 illustrates an example of prioritization defaults for the Chrome browser.

Figure 6:
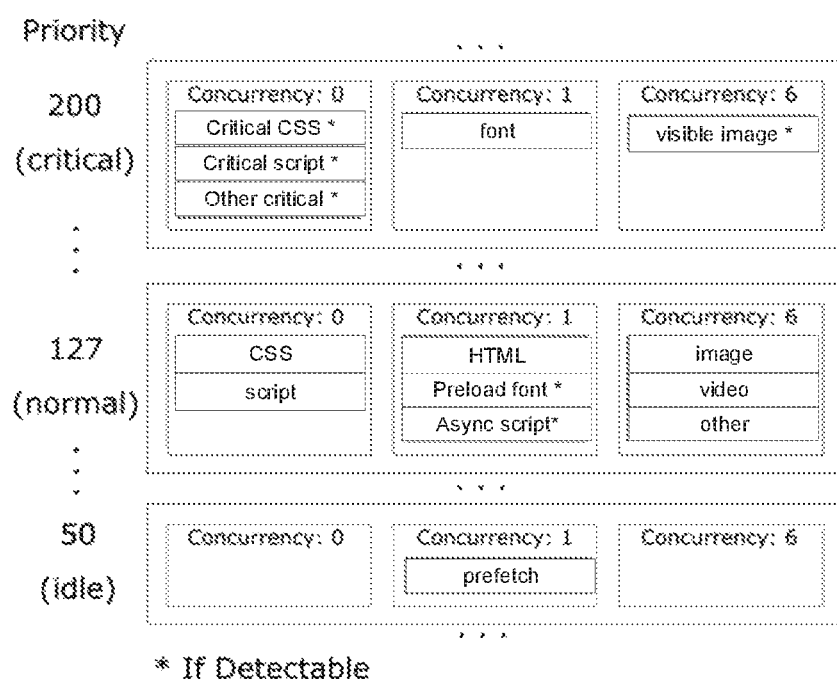
FIG. 6 is a block diagram illustrating another example prioritization scheme of the prioritization module.

The proxy server can also support a logic layer that provides additions defaults using browser-specific heuristics (e.g., in a first-party worker that runs on all requests). The basic mappings can be the same, but the logic can also include prioritization tweaks for visible images, critical scripts, and similar content items using the inbound priority information from the browsers as available (e.g., the Chrome and Firefox browsers). FIG. 6 illustrates the more detailed mapping supported by the logic layer.

The prioritization will be affected by the prioritization module when the response headers are available, so the content type can be detected (if specified) and the requested HTTP/2 prioritization information can be leveraged. By default, the responses can be prioritized based on content type. In some cases, for well-known browser engines that provide content-specific weights the priorities can be adjusted. For example, the Chrome browser sets the exclusive bit and assigns the weight based on the internal priority, the Safari browser maps the internal priorities to weights, and the Firefox browser uses the phantom leader/follower groupings.

Figure 7:
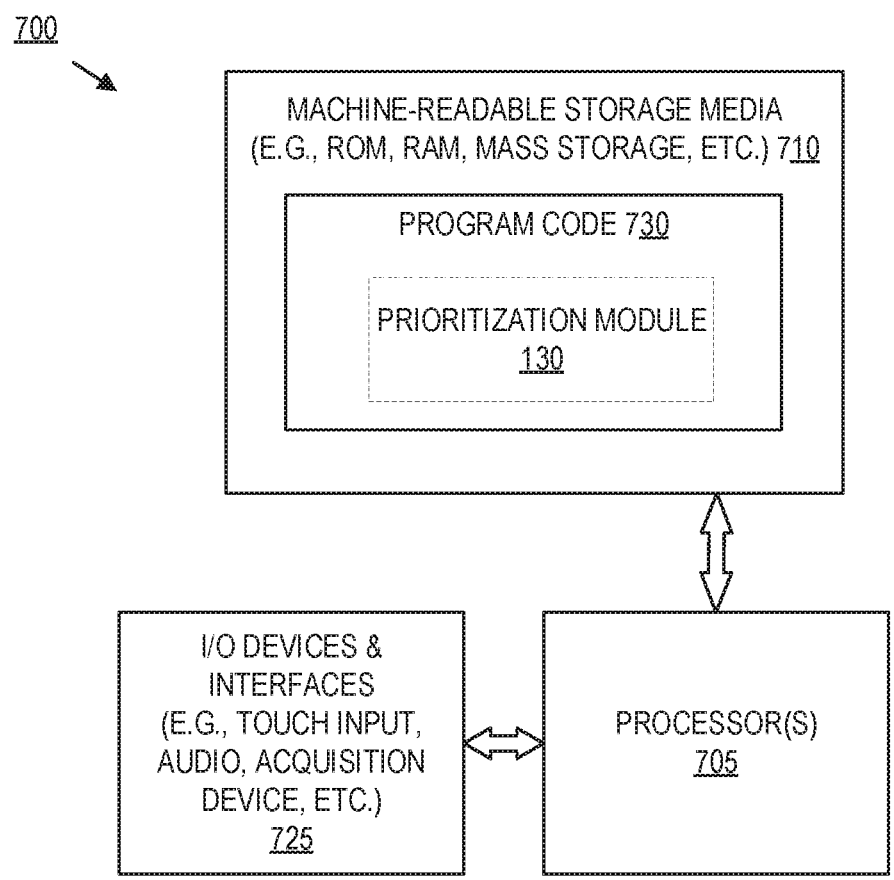
FIG. 7 is a block diagram of one example of the proxy server architecture in which the prioritization module is executed according to one embodiment.

FIG. 7 illustrates a block diagram for an exemplary data processing system 700 that may be used in some embodiments. Data processing system 700 includes one or more processors 705 and connected system components (e.g., multiple connected chips). One or more such data processing systems 700 may be utilized to implement the embodiments and operations described with respect to the proxy server, or other electronic device.

The data processing system 700 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 710 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 705. For example, the depicted machine-readable storage media 710 may store program code 730 that, when executed by the processor(s) 705, causes the data processing system 700 to execute the prioritization module 130.

The data processing system 700 also includes one or more input or output ("I/O") devices and interfaces 725, which are provided to allow a user to provide input to, receive output from, and otherwise transfer data to and from the system. These I/O devices 725 may include a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. The I/O devices and interfaces 725 may include wireless transceivers, such as an IEEE 802.11 transceiver, an infrared transceiver, a Bluetooth transceiver, a wireless cellular telephony transceiver (e.g., 2G, 3G, 7G, 5G), an NFC transceiver, or another wireless protocol to connect the data processing system 700 with another device, external component, or a network and receive stored instructions, data, tokens, etc. For instance, a wired or wireless transceiver may transmit and receive messages to and from the proxy server as described herein.

Additional components, not shown, may also be part of the system 700, and, in certain embodiments, fewer components than that shown in FIG. 7 may also be used in a data processing system 700. One or more buses may be used to interconnect the various components shown in FIG. 7.

Thus, an electronic device (e.g., a proxy server) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The techniques shown in the figures can be implemented using code and data stored and executed on one or more computing devices (e.g., client device, proxy server, origin server, etc.). Such computing devices store and communicate (internally and/or with other computing devices over a network) code and data using machine-readable media, such as non-transitory machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
receiving, at a proxy server, a request for a plurality of content items from a client device, where the proxy server is in a distributed cloud computing platform, the request including priority information set by a browser of the client device;
receiving, at the proxy server, at least one of the plurality of content items from an origin server or a cache;
determining, at the proxy server, a domain priority scheme of a domain of the plurality of content items based on priority information provided by the domain of the plurality of content items or a type of each of the plurality of content items received from the origin server or the cache;
determining, at the proxy server, a priority scheme for ordering a sending of the plurality of content items to the client device, where the priority scheme differs from a client priority scheme of the client device and differs from the domain priority scheme of the domain of the plurality of content items, and where the priority scheme is a combination of a default priority scheme of the proxy server, the priority information from the browser, and the domain priority scheme of the domain of the plurality of content items, where the combination selects the default priority scheme of the proxy server or the domain priority scheme of the domain per content item in the plurality of content items over the priority information of the browser in response to availability of the priority information of the default priority scheme or the domain priority scheme provided by the domain, where a priority for each content item in the plurality of content items is selected on a frame-by-frame level, and where a data stream of content items being sent to the client device is chunked into a configurable frame size;
sending, by the proxy server, a response including a current frame of each of the plurality of content items to the client device in an order according to the determined priority scheme as applied to the current frame;
determining a type of each of the plurality of content items;
determining a concurrency value for each of the plurality of content items;
reordering the plurality of content items with a priority based on respective type of the plurality of content items and the determined priority scheme;
reordering the plurality of content items with a same priority value according to concurrency value, where the plurality of content items with a same concurrency value are grouped and share bandwidth;
filling the current frame with highest priority level and concurrency value 0 content items that are currently available at the proxy server, where the highest priority level content items having concurrency 0 are available; and
filling the current frame with highest priority level and concurrency values greater than 0 content items that are currently available at the proxy server using a round robin to select a frame from each concurrency group, where concurrency value 0 content items are not available and content items for concurrency values greater than 0 content items are available.

2. The method of claim 1, wherein the determined priority scheme is a selection of a priority defined by the domain of the plurality of content items per content item over a priority defined by the default priority scheme.

3. The method of claim 1, wherein the plurality of content items includes any one of a web page, and image, an audio file, a web application, or a script.

4. A non-transitory machine-readable storage medium that stores instructions, that when executed by a processor of a first server, causes said processor to perform operations comprising:
receiving, at a proxy server, a request for a plurality of content items from a client device, where the proxy server is in a distributed cloud computing platform, the request including priority information set by a browser of the client device;
receiving, at the proxy server, at least one of the plurality of content items from an origin server or a cache;
determining, at the proxy server, a domain priority scheme of a domain of the plurality of content items based on priority information provided by the domain of the plurality of content items or a type of each of the plurality of content items received from the origin server or the cache;
determining, at the proxy server, a priority scheme for ordering a sending of the plurality of content items to the client device, where the priority scheme differs from a client priority scheme of the client device and differs from the domain priority scheme of the domain of the plurality of content items, and where the priority scheme is a combination of a default priority scheme of the proxy server, the priority information from the browser, and the domain priority scheme of the domain of the plurality of content items, where the combination selects the default priority scheme of the proxy server or the domain priority scheme of the domain per content item in the plurality of content items over the priority information of the browser in response to availability of the priority information of the default priority scheme or the priority scheme provided by the domain, where a priority for each content item in the plurality of content items is selected on a frame-by-frame level, and where a data stream of content items being sent to the client device is chunked into a configurable frame size;
sending, by the proxy server, a response including a current frame of each of the plurality of content items to the client device in an order according to the determined priority scheme as applied to the current frame;
determining a type of each of the plurality of content items;
determining a concurrency value for each of the plurality of content items;
reordering the plurality of content items with a priority based on respective type of the plurality of content items and the determined priority scheme;
reordering the plurality of content items with a same priority value according to concurrency value, where the plurality of content items with a same concurrency value are grouped and share bandwidth;
filling the current frame with highest priority level and concurrency value 0 content items that are currently available at the proxy server, where the highest priority level content items having concurrency 0 are available; and
filling the current frame with highest priority level and concurrency values greater than 0 content items that are currently available at the proxy server using a round robin to select a frame from each concurrency group, where concurrency value 0 content items are not available and content items for concurrency values greater than 0 content items are available.

5. The non-transitory machine-readable storage medium of claim 4, wherein the determined priority scheme is determined by a selection of a priority defined by the domain of the plurality of content items per content item over a priority defined by the default priority scheme.

6. The non-transitory machine-readable storage medium of claim 4, wherein the plurality of content items include any one of a web page, and image, an audio file, a web application, or a script.

7. A first server, comprising:
a processor; and
a non-transitory machine-readable storage medium that provides instructions that, when executed by the processor, causes the first server to perform operations including:
receive a request for a plurality of content items from a client device, where a proxy server is in a distributed cloud computing platform, the request including priority information set by a browser of the client device;
receive at least one of the plurality of content items from an origin server or a cache;
determining, at the proxy server, a domain priority scheme of a domain of the plurality of content items based on priority information provided by the domain of the at least one of the plurality of content items or a type of each of the plurality of content items received from the origin server or the cache;
determine a priority scheme for ordering a sending of the plurality of content items to the client device, where the priority scheme differs from a client priority scheme of the client device and differs from the domain priority scheme of a domain of the plurality of content items, and where the priority scheme is a combination of a default priority scheme of the proxy server, the priority information from the browser, and the domain priority scheme of the domain of the plurality of content items, where the combination selects the default priority scheme of the proxy server or the domain priority scheme of the domain per content item in the plurality of content items over the priority information of the browser in response to availability of the priority information of the default priority scheme or the priority scheme provided by the domain, where a priority for each content item in the plurality of content items is selected on a frame by frame level, and where a data stream of content items being sent to the client device is chunked into a configurable frame size;
send a response including a current frame of each of the plurality of content items to the client device in an order according to the determined priority scheme as applied to the current frame;
determine a type of each of the plurality of content items;
determine a concurrency value for each of the plurality of content items;
reorder the plurality of content items with a priority based on respective type of the plurality of content items and the determined priority scheme;
reorder the plurality of content items with a same priority value according to concurrency value, where the plurality of content items with a same concurrency value are grouped and share bandwidth;
fill the current frame with highest priority level and concurrency value 0 content items that are currently available at the proxy server, where the highest priority level content items having concurrency 0 are available; and
fill the current frame with highest priority level and concurrency values greater than 0 content items that are currently available at the proxy server using a round robin to select a frame from each concurrency group, where concurrency value 0 content items are not available and content items for concurrency values greater than 0 content items are available.

8. The first server of claim 7, wherein the determined priority scheme is a selection of a priority defined by the domain of the plurality of content items per content item over a priority defined by the default priority scheme.

9. The first server of claim 7, wherein the plurality of content items include any one of a web page, and image, an audio file, a web application, or a script.

10. The method of claim 1, wherein the response includes a head information indicating a parent stream, priority level, concurrency level, and priority changes at specific byte offsets.

11. The non-transitory machine-readable storage medium of claim 4, wherein the response includes a head information indicating a parent stream, priority level, concurrency level, and priority changes at specific byte offsets.

12. The first server of claim 7, wherein the response includes a head information indicating a parent stream, priority level, concurrency level, and priority changes at specific byte offsets.

* * * * *